US012171718B2

(12) United States Patent
Berlich et al.

(10) Patent No.: US 12,171,718 B2
(45) Date of Patent: Dec. 24, 2024

(54) MULTI-CHAMBER BAG FOR MEDICAL PURPOSES AND METHOD FOR RECOGNITION OF THE STATE OF A SEPARABLE SEAM OF A MULTI-CHAMBER BAG FOR MEDICAL PURPOSES

(71) Applicant: FRESENIUS MEDICAL CARE DEUTSCHLAND GMBH, Bad Homburg (DE)

(72) Inventors: Robert Berlich, St. Wendel (DE); Jochen Huppert, Saarbrucken (DE); Andreas Laubrock, Wehrheim (DE); Gerhard Mager, Bad Homburg (DE)

(73) Assignee: FRESENIUS MEDICAL CARE DEUTSCHLAND GMBH, Bad Homburg (DE)

( * ) Notice: Subject to any disclaimer, the term of this patent is extended or adjusted under 35 U.S.C. 154(b) by 1012 days.

(21) Appl. No.: 17/257,866

(22) PCT Filed: Jul. 9, 2019

(86) PCT No.: PCT/EP2019/068337
§ 371 (c)(1),
(2) Date: Jan. 5, 2021

(87) PCT Pub. No.: WO2020/011751
PCT Pub. Date: Jan. 16, 2020

(65) Prior Publication Data

US 2021/0196570 A1 Jul. 1, 2021

(30) Foreign Application Priority Data

Jul. 11, 2018 (DE) ..................... 10 2018 116 787.3

(51) Int. Cl.
*A61J 1/18* (2023.01)
*A61J 1/10* (2006.01)
(Continued)

(52) U.S. Cl.
CPC . *A61J 1/18* (2013.01); *A61J 1/10* (2013.01); *A61J 1/12* (2013.01); *A61J 1/2093* (2013.01);
(Continued)

(58) Field of Classification Search
CPC ........ A61J 1/10; A61J 1/12; A61J 1/18; A61J 1/2093; A61J 2205/10; A61J 2205/20; A61J 2205/50
See application file for complete search history.

(56) References Cited

U.S. PATENT DOCUMENTS 3,074,451 A 1/1963 Whitney
5,514,106 A 5/1996 D'Silva
(Continued)

FOREIGN PATENT DOCUMENTS

JP 2004292041 A 10/2004

OTHER PUBLICATIONS

International Preliminary Report on Patentability issued in corresponding International Patent Application No. PCT/EP2019/068337 (English translation) dated Jan. 12, 2021 (6 pages).
(Continued)

*Primary Examiner* — John Kim
(74) *Attorney, Agent, or Firm* — Kilyk & Bowersox, P.L.L.C.

(57) ABSTRACT

The invention relates to a multi-chamber bag 1 for medical purposes which is formed by films 2, 3, in particular flexible films, that are arranged against one another, are made of an at least partially transparent material and are interconnected in a liquid-tight manner using at least one non-separable seam 5, the bag being divided into at least two chambers 1A, 1B by at least one separable seam 8, by means of which the films arranged against one another are interconnected in a liquid-tight manner. The multi-chamber bag according to the invention is characterised by at least one visually perceptible structure 10 that signals the state of the at least one separable seam 8 and can be easily optically detected. Using this visible structure 10, the user can immediately identify whether the seam 8 is open or closed. The structure is composed of structural elements 11 which the films 2, 3 arranged against one another comprise in the region of the separable seam 8 and are in a predetermined spatial arrangement relative to one another such that the structural elements in the region of the separable seam complement one another to form the structure signalling the state of the separable seam when the separable seam is closed, such that the films in the region of the separable seam lie against one another
(Continued)

in a predetermined orientation, and do not complement one another to form the structure signalling the state of the separable seam when the separable seam is open, such that the films in the region of the separable seam do not lie against one another in a predetermined orientation, meaning that the predetermined spatial arrangement of the structural elements relative to one another in the region of the separable seam no longer exists.

19 Claims, 6 Drawing Sheets

(51) Int. Cl.
*A61J 1/12* (2006.01)
*A61J 1/20* (2006.01)

(52) U.S. Cl.
CPC ........ *A61J 2205/10* (2013.01); *A61J 2205/20* (2013.01); *A61J 2205/50* (2013.01)

(56) References Cited

U.S. PATENT DOCUMENTS

| | | | |
|---|---|---|---|
| 9,011,004 | B2 | 4/2015 | Paulin |
| 10,188,586 | B2 | 1/2019 | Nordquist et al. |
| 2006/0065565 | A1 | 3/2006 | Masuda et al. |
| 2007/0123836 | A1 | 5/2007 | Fukushima et al. |
| 2013/0018353 | A1 | 1/2013 | Chung et al. |
| 2013/0268113 | A1 | 10/2013 | Sandvik et al. |

OTHER PUBLICATIONS

International Search Report and Written Opinion issued in corresponding International Patent Application No. PCT/EP2019/068337 (with English translation of International Search Report) dated Oct. 24, 2019 (11 pages).

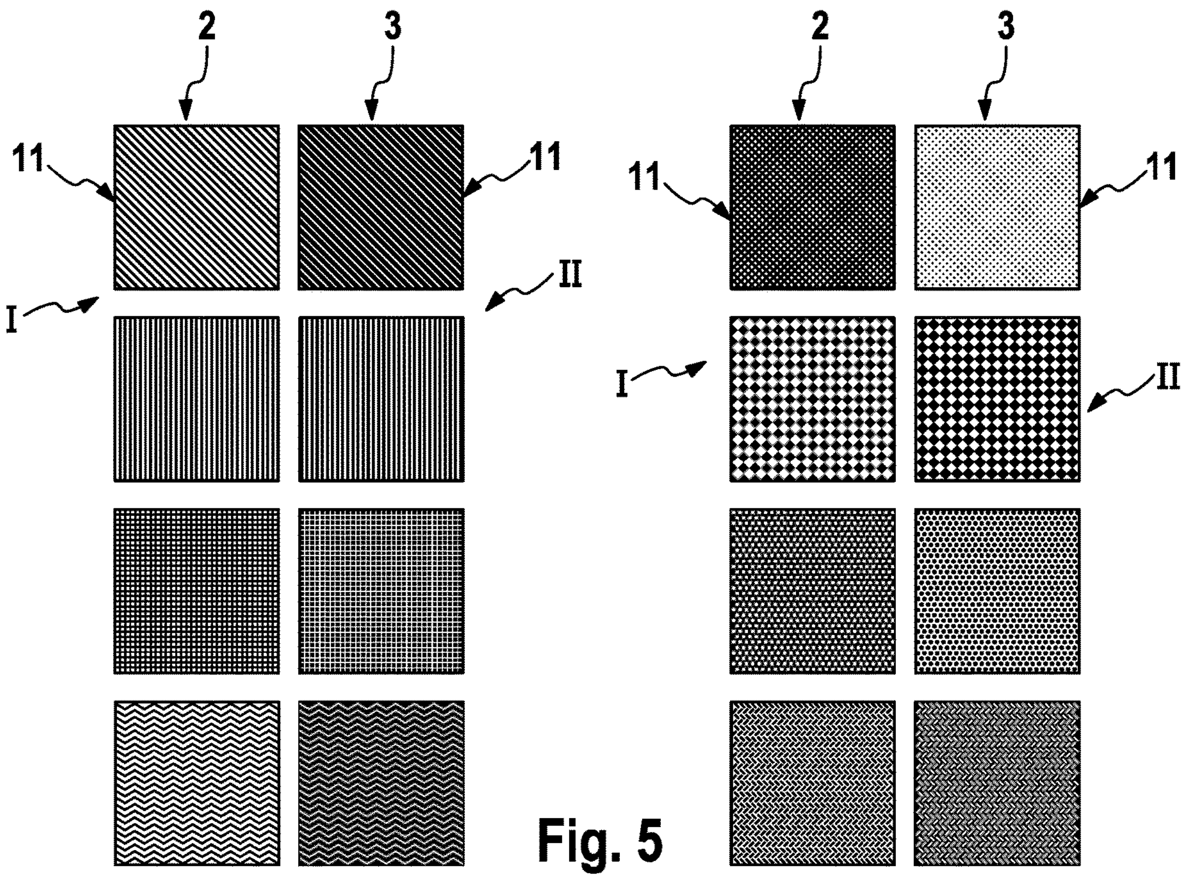
Fig. 5
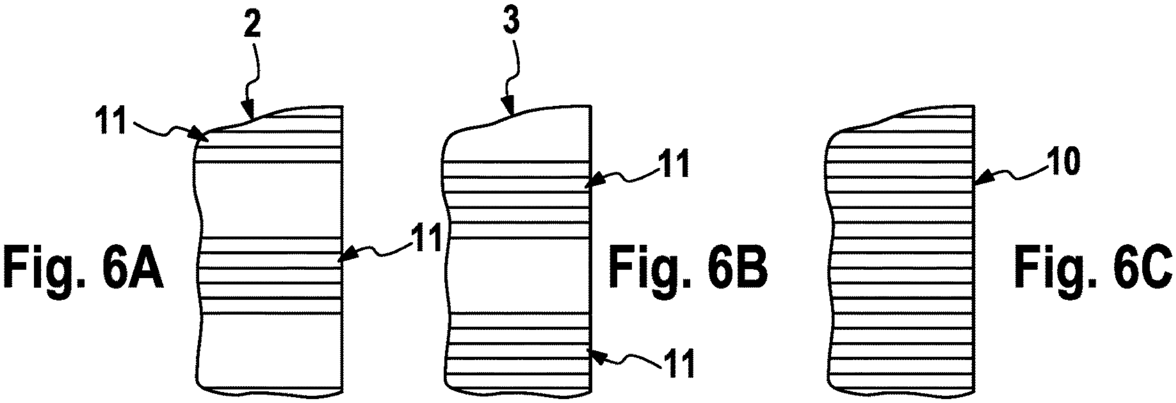
Fig. 6A
Fig. 6B
Fig. 6C
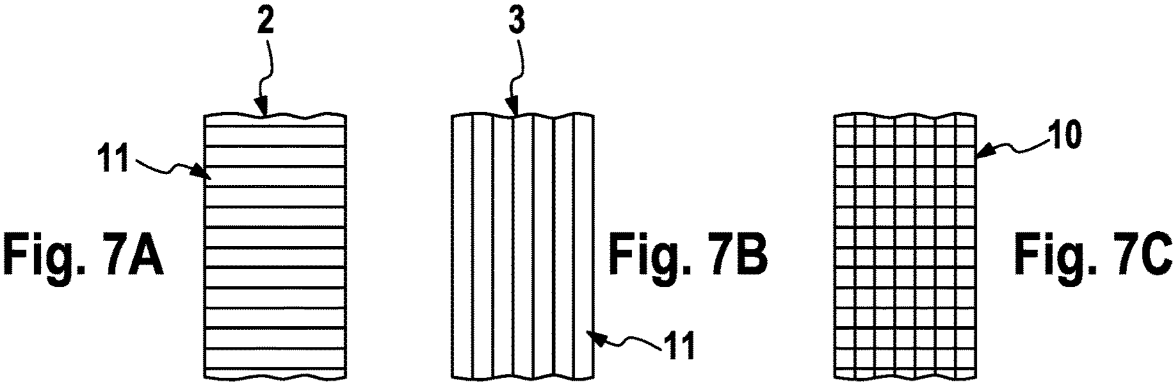
Fig. 7A
Fig. 7B
Fig. 7C

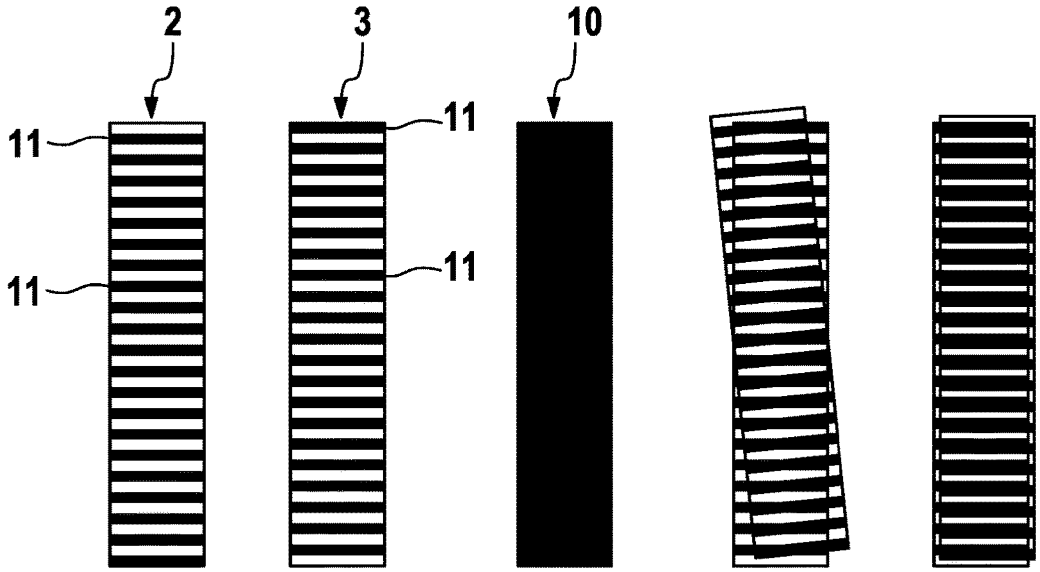
Fig. 8A Fig. 8B Fig. 8C Fig. 8D Fig. 8E
Fig. 9A
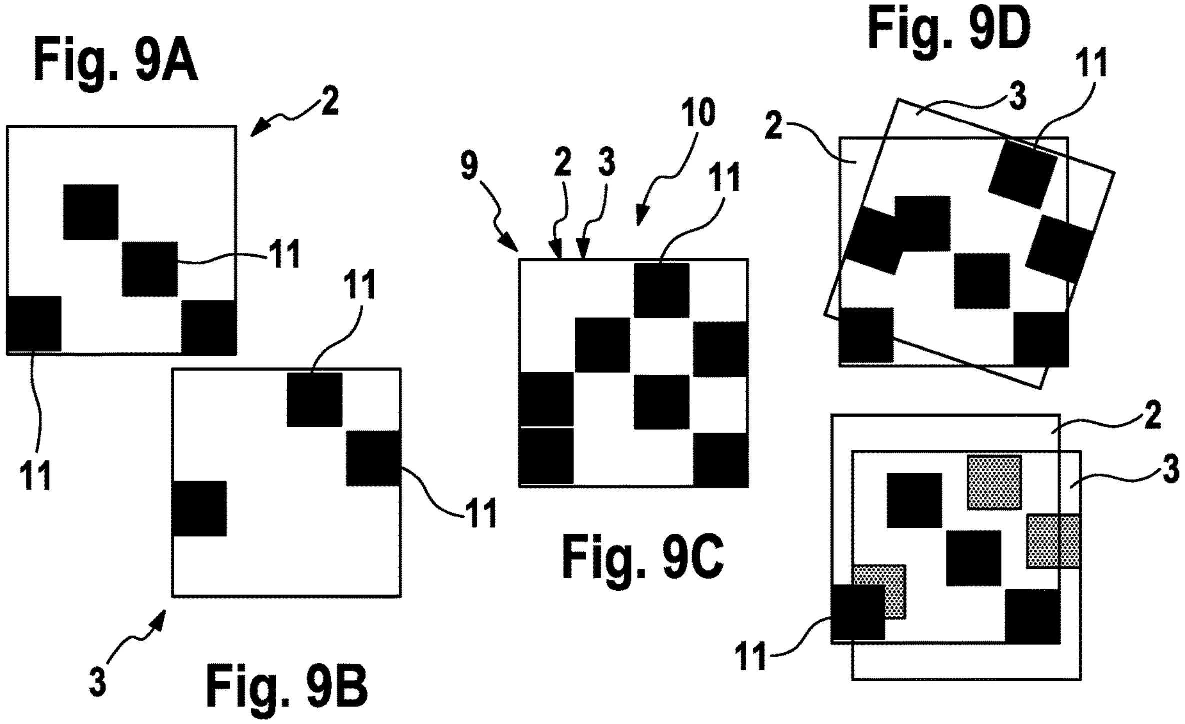
Fig. 9B
Fig. 9C
Fig. 9D
Fig. 9E

MULTI-CHAMBER BAG FOR MEDICAL PURPOSES AND METHOD FOR RECOGNITION OF THE STATE OF A SEPARABLE SEAM OF A MULTI-CHAMBER BAG FOR MEDICAL PURPOSES

This application is a National Stage Application of PCT/EP2019/068337, filed Jul. 9, 2019, which claims priority to German Patent Application No. 10 2018 116 787.3, filed Jul. 11, 2018.

The invention relates to a multi-chamber bag for medical purposes which is formed by films, in particular flexible films, that are arranged against one another, are made of an at least partially transparent material and are interconnected in a liquid-tight manner using at least one non-separable seam, the bag being divided into at least two chambers by at least one separable seam, by means of which the films arranged against one another are interconnected in a liquid-tight manner.

In this context, a separable seam is understood to be a seam that can be opened by a user as intended, while a non-separable seam is not intended to be opened by the user. The separable seam may for example be opened by applying a certain force, for example when pressure is exerted on the bag. The non-separable seam and the separable seam need to be designed such that the separable seam opens when the force required to open the separable seam is applied, while the non-separable seam remains intact. The separable seams are also referred to as peel seams.

Bags made of films are used in the medical field to receive liquids. To produce a film bag, an upper and a lower film having a peripheral seam can be joined together in a liquid-tight manner. Alternatively, the open ends of a film sleeve can be closed by seams. Irrespective of the production method, the bags thus have two pieces of film arranged against one another, which are referred to in the following as films. The two films generally consist of a material that is at least partially transparent to light. The films may each consist of a plurality of plies or layers.

The bags may for example receive medical solutions for infusion or dialysis. Bags of this type can be hung on a suitable stand such that the corresponding solution, for example dialysate, can flow out of an outlet that is arranged on the bottom edge of the bag in the position of use. A hose line can be connected to the outlet of the bag. The liquid can be conveyed under the influence of gravity or using a pump. Alternatively, or additionally, the bag may also be emptied using pressure, for example using hydraulic, pneumatic or mechanical pressure.

Multi-chamber bags are used in the medical field to receive various liquids that are only intended to be mixed together shortly before the intended use of the bag. They may for example contain two chambers (compartments) that are separated from one another in a liquid-tight manner by a separable seam. However, bags comprising more than two chambers are also known. The chambers may be filled with liquids and/or solid or pasty substances and/or gases, which are intended to be separated from one another during storage. Either all the chambers may be filled with one liquid each, or at least one chamber may be filled with a dry concentrate and at least one chamber with a liquid, the liquids being intended to be separated from one another during storage, or the at least one dry concentrate being intended to be separated from the at least one liquid, respectively.

One specific application is that of providing solutions that contain bicarbonate and calcium in physiological concentrations. Both components being in one solution can result in precipitates after a while, for example calcium carbonate. For this reason, the liquids are stored separately from one another in individual chambers. The separable seam between the chambers is only opened immediately prior to use, such that the liquids can be mixed together to form the ready-to-use solution having the physiological concentration. The liquids in the individual chambers do not, however, have the physiological concentration, and the use thereof can result in harm to the patient. Therefore, it is extremely important that the separable seam is actually opened.

It is also important that the seam remains closed until the solution is used, since the final solution would no longer be suitable for use if the two liquids were mixed together prematurely.

It is currently solely the user's responsibility to monitor the state of the separable seam, i.e. whether the seam is open or closed. However, since the bag films are at least partially transparent to light, in practice it is not readily apparent whether the separable seam is open or closed.

The problem addressed by the invention is to provide a multi-chamber bag for medical purposes that makes it possible to rapidly and reliably identify the state of a separable seam of the multi-chamber bag.

Another problem addressed by the invention is to provide a method by means of which the state of a separable seam of a multi-chamber bag for medical purposes can be rapidly and reliably identified.

These problems are solved according to the invention by the features of the independent claims. The dependent claims relate to advantageous embodiments of the invention.

The multi-chamber bag according to the invention is characterised by at least one visually perceptible structure that signals the state of the at least one separable seam and can be easily optically detected. Using this visible structure, the user can immediately identify whether the seam is open or closed, i.e. intact. The structure is composed of structural elements that the films, in particular flexible films, that are arranged against one another comprise in the region of the separable seam and are in a predetermined spatial arrangement relative to one another such that the structural elements in the region of the separable seam complement one another to form the structure signalling the state of the separable seam when the separable seam is closed, such that the films in the region of the separable seam lie against one another in a predetermined orientation, and do not complement one another to form the structure signalling the state of the separable seam when the separable seam is open, such that the films in the region of the separable seam do not lie against one another in a predetermined orientation, meaning that the predetermined spatial arrangement of the structural elements relative to one another in the region of the separable seam no longer exists.

The films of the multi-chamber bag according to the invention are at least partially transparent to light, for example are see-through, transparent, partially transparent or translucent (opaque, diffusely transparent) to the viewer. According to the invention, the films may be transparent or translucent (opaque). In practice, the films are intended to be transparent, such that the user can assess the liquids contained therein on the basis of their visual appearance, and therefore impermissible precipitates, clouding, discolouration, etc. can be identified. At least partially transparent or largely transparent films are therefore particularly preferred.

The separable seam may be designed in any desired manner. Preferably, the seam is a welded seam, and so the two films are welded together.

When the films do not lie against one another in the region of the seam in a predetermined spatial arrangement, i.e. are arranged at a distance from one another or are misaligned relative to one another or are offset from one another, the predetermined spatial arrangement of the structural elements relative to one another no longer exists, and therefore the structure cannot be identified by the viewer or at least cannot be clearly identified by the viewer. When the seam is closed, however, the two films lie flat against one another, such that the films form a visual unit and the structure is apparent to the viewer.

A particular meaning may be ascribed to the visually perceptible structure, with it being possible for the user to understand the structure to be an indication of a closed seam.

The visually perceptible structure may be of any desired shape and extent. A plurality of structures which can be assigned to one seam or different seams may also be provided on the bag. The structural elements that compose the structure may be any desired elements. They may be image elements or symbol elements that can be applied to the films. The image elements or symbol elements may be circular, arc-shaped, elliptical, square or rectangular elements. They may also be dots or dashes, in particular parts of characters, or may also form patterns, for example a striped pattern.

The image elements and/or symbol elements are preferably printed onto the films. Known printing techniques may be used for this purpose. In this case, the outer faces of the films that face outwards may be printed. The structural elements may be transparent regions of the films that are a particular colour. They may also be incorporated into the film, for example the films may be dyed.

When the upper and lower film lie against one another, the image elements and/or symbol elements can show through the lower film when the viewer looks at the upper film from above, or vice versa.

The structural elements according to the invention are not the printed matter known from the prior art that is provided on the front and/or back of known liquid bags, for example manufacturer information, instructions for use, manufacturing date, use-by date, storage instructions, or hazard warnings, which is intended to be identifiable or readable by the user irrespective of the state of the separable seam, and which (i) are not designed such that they are incomplete or illegible when the two films do not lie against one another, and only join together to provide meaning when the two films lie against one another, and (ii) are not designed such that they are illegible when the two films lie against one another, and are only legible when the two films do not lie against one another.

By contrast, for printed matter according to the invention including instructions for use, it may be provided that the printed matter on the films for example makes the wording "Use within 4 hours" legible in the region of the peel seam once said peel seam has been opened, whereas the wording is illegible when the peel seam is closed owing to printed matter being on the rear film. Conversely, in another embodiment according to the invention, the printed matter could be designed such that, when the peel seam is closed, the wording "Open peel seam before use" is legible and becomes illegible after the peel seam has been opened.

One embodiment of the bag according to the invention provides that the structural elements in the region of the separable seam are arranged in a predetermined spatial arrangement relative to one another such that regions of the upper film which comprise the structural elements lie over regions of the lower film which do not comprise the structural elements, and regions of the lower film that comprise the structural elements lie below regions of the upper film which do not comprise the structural elements, such that the structural elements, in the region of the separable seam, complement one another to form the structure signalling the state of the separable seam when the films lie against one another in the region of the separable seam. Therefore, the image elements and/or symbol elements are alternately arranged on the upper and the lower film. They therefore constitute parts of a unit. If the image elements and/or symbol elements for example form striped patterns, the unit of the parts is then apparent as a continuous area.

Another embodiment of the bag according to the invention provides that the structural elements are transparent regions of the films that are different colours, the upper film having, in the region of the separable seam, at least one transparent region that is a first colour and lies over a transparent region of the lower film that is a second colour, which differs from the first colour. The structural elements, as the structure signalling the state of the separable seam, are then apparent to the viewer in a third colour, which is a mixed colour made up of the first and second colour, when the films lie against one another in the region of the separable seam.

The structural elements may also be designed as patterns, a structural element forming a first pattern being provided on the upper film in the region of the separable seam and a structural element forming a second pattern being provided on the lower film in the region of the separable seam, the first pattern differing from the second pattern such that the structural elements, as the structure signalling the state of the separable seam, are apparent to the viewer as a third pattern, which differs from the first and second patterns when the films lie against one another. The patterns may for example be repeating arrangements of dots or dashes or other image elements and/or symbol elements.

In a preferred embodiment, the structure signalling the state of the seam is a word or a series of words or a symbol, such that the viewer is given an immediately understandable indication of the state of the seam. For example, the structure may be the word "CLOSED". In this embodiment, a first part of the word, for example the word "CLOSED", or the series of words or the symbol is applied in a region on the upper film of the films arranged against one another, and a second part of the word or the series of words or the symbol is applied in a region of the lower film of the films arranged against one another that is below the region in which the first part is applied. When the seam is closed and the films lie against one another, the first and the second part complement one another to form the word, for example the word "CLOSED", or the series of words or the symbol, such that the viewer can immediately identify the word.

The structure signalling the state of the seam may not only be identified by the user, but also by using a monitoring apparatus, which allows automated monitoring. The monitoring apparatus may comprise an optical read apparatus and an evaluation unit. The evaluation unit may be configured such that the visually perceptible structure is detected. To do this, the known algorithms for image recognition or image acquisition can be implemented in the evaluation unit.

The visually perceptible structure may also be a machine-readable code, for example a bar code or a matrix code, which can be read out easily using suitable read equipment. A machine-readable code in the form of a graphical structure has the advantage that the graphical structure not only allows the state of the separable seam to be monitored in an automated manner, but the structure can also be used as an information medium for other information, for example relating to the content of the bag and/or the use thereof. In this embodiment, the plurality of elements of the machine-readable code in the region of the separable seam are arranged in a predetermined spatial arrangement relative to one another on the films that are arranged against one another such that the elements complement one another to form the machine-readable code when the separable seam is closed, such that the films in the region of the separable seam lie against one another, and do not complement one another to form the machine-readable code when the separable seam is open, such that the films in the region of the separable seam do not lie against one another, meaning that the predetermined spatial arrangement of the elements forming the machine-readable code relative to one another no longer exists.

It is also possible to combine the various embodiments, for example to combine coloured surfaces with characters or the like.

An alternative embodiment of the multi-chamber bag according to the invention for medical purposes provides that the at least one visually perceptible structure signalling the state of the separable seam is formed by regions of films that lie against one another and are designed as polarisers, the structure signalling the state of the separable seam being apparent to the viewer when the separable seam is closed, such that the films in the region of the separable seam lie against one another in a predetermined orientation, and the structure signalling the state of the separable seam not being apparent to the viewer when the separable seam is open, such that the films in the region of the separable seam do not lie against one another in a predetermined orientation, meaning that the predetermined spatial arrangement of the polarisers relative to one another no longer exists. In this case, it is irrelevant how the polarising properties are imparted on the films, and this could be achieved by additional manufacturing steps during production, for example stretching or embossing. The films that lie against one another may also each consist of a plurality of plies or layers, with only one of the plies or layers having the polarising properties.

The two films that lie against one another in the region of the separable seam may have different angles of polarisation, for example. The films having the different polarising properties may for example be arranged such that light cannot pass through the films, or can only pass through said films to a limited extent when the films lie against one another in the predetermined spatial orientation, i.e. the separable seam is closed, and light can pass through the films when they do not lie against one another in the predetermined spatial orientation, i.e. the separable seam is open. The closed seam is then apparent to the viewer as a black or dark area, while the open seam is apparent as a light or grey area.

The method according to the invention for identifying the state of a separable seam of multi-chamber bags for medical purposes is characterised in that the multi-chamber bag is provided with at least one visually perceptible structure that signals the state of the separable seam and is composed of structural elements that the films arranged against one another comprise in the region of the separable seam and are in a predetermined spatial arrangement relative to one another such that the structural elements in the region of the separable seam complement one another to form the structure signalling the state of the separable seam when the separable seam is closed, such that the films in the region of the separable seam lie against one another in a predetermined orientation, and do not complement one another to form the structure signalling the state of the separable seam when the separable seam is open, such that the films in the region of the separable seam do not lie against one another in a predetermined orientation, meaning that the predetermined spatial arrangement of the structural elements relative to one another in the region of the separable seam no longer exists.

The bags are then monitored using a monitoring apparatus. The monitoring apparatus comprises an optical read apparatus for detecting the structure signalling the state of the seam, which structure may be a machine-readable code, and comprises an evaluation unit. In practice, each bag may be scanned using suitable read equipment. The evaluation unit is configured such that a signal signalling the state of the separable seam is generated when the structure signalling the state of the seam is detected on the bag. The signal may indicate an intact seam or an open seam. A plurality of different signals may also be generated. The signal may also be subject to further processing, in order to carry out an intervention in the control of a medical device, in particular a blood treatment device.

BRIEF DESCRIPTION OF THE DRAWINGS

Several embodiments of the invention will be explained in greater detail below with reference to the drawings, in which:

FIG. 5 shows other embodiments of graphical structures for signalling the state of the seam, which are designed as patterns, FIG. 6A-6C show another embodiment of a graphical structure for signalling the state of the seam, FIG. 7A-7C show another embodiment of a graphical structure for signalling the state of the seam, FIG. 8A-8E show another embodiment of a graphical structure for signalling the state of the seam, FIG. 9A-9E show an embodiment of a graphical structure designed as a machine-readable matrix code for signalling the state of the seam.

DETAILED DESCRIPTION OF THE PRESENT INVENTION

Figure 1:
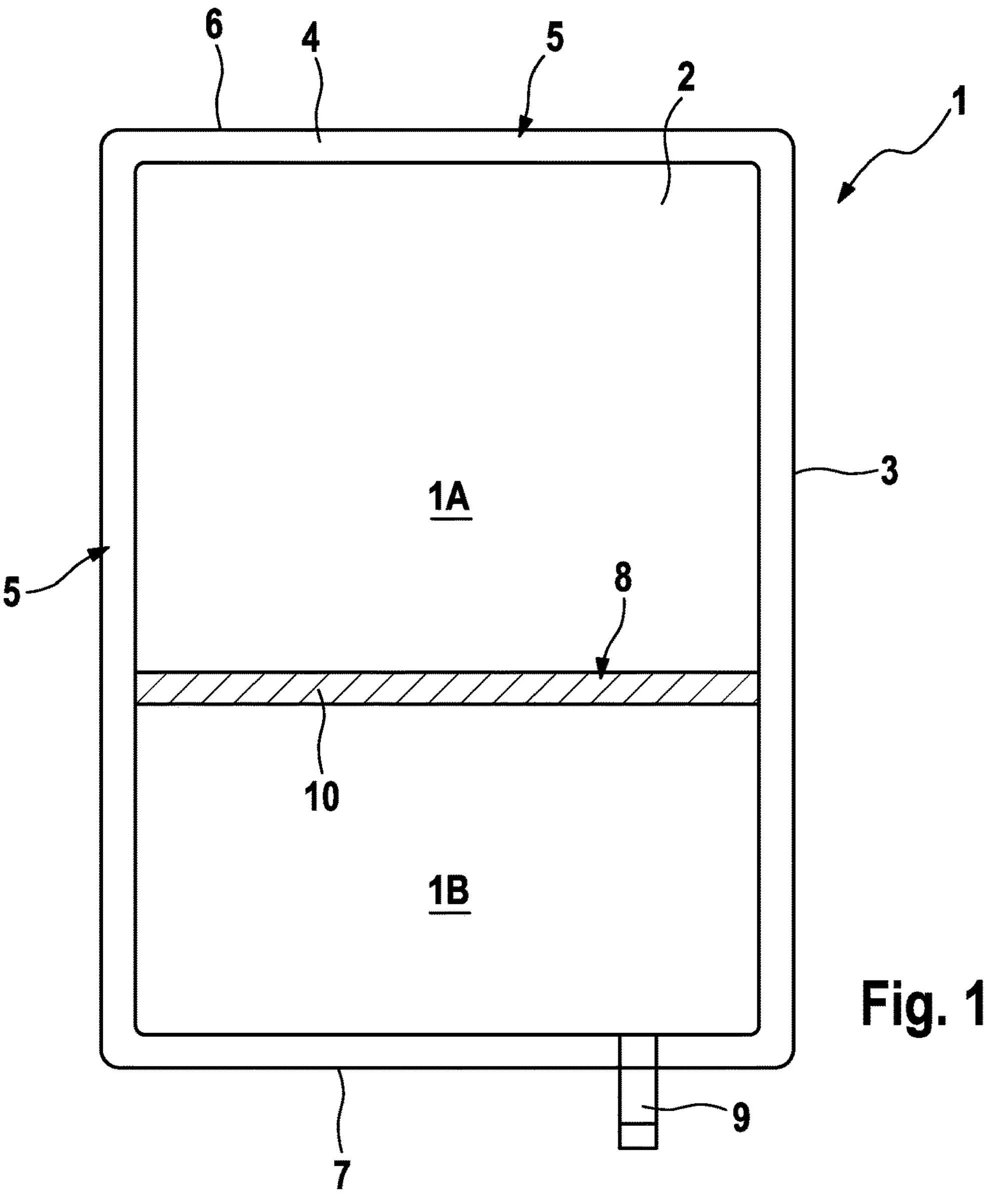
FIG. 1 is a simplified schematic plan view of an embodiment of the multi-chamber bag according to the invention.

FIG. 1 is a plan view of a multi-chamber bag 1 for receiving liquids. The multi-chamber bag 1 comprises an upper film 2 and a lower film 3, which are interconnected at the edges 4 by a peripheral seam 5. The seam may be a welded seam, the films, in particular flexible films, being welded to one another. This seam is referred to as a non-separable seam in the following. The bag 1 may also be produced from a film sleeve that is closed by a non-separable seam at both the upper and the lower edge 6, 7.

The multi-chamber bag 1 comprises a first chamber 1A (compartment) and a second chamber 1B (compartment) (dual-chamber bag). The two chambers 1A, 1B are separated by a separable seam 8 (peel seam), which extends between the portions of the non-separable seam that run along the longitudinal sides of the bag.

The first chamber 1A is filled with a first liquid and the second chamber is filled with a second liquid, which are intended to be stored separately from one another and only mixed together shortly before use. In order to mix the two liquids together to form the ready-to-use solution, pressure is exerted on the bag such that the separable seam 8 is opened. The first liquid may for example be a component of a dialysate containing bicarbonate, and the second liquid may for example be a component of a dialysate containing calcium.

The multi-chamber bag 1 comprises a connector 9 (port) on the lower edge 7 of the bag, to which a hose line (not shown) can be connected in order to remove the liquid. The bag 1 can be hung on a suitable stand and the ready-to-use solution can be conveyed under the influence of gravity or using a pump. A multi-chamber bag of this type is part of the prior art.

Figure 2:
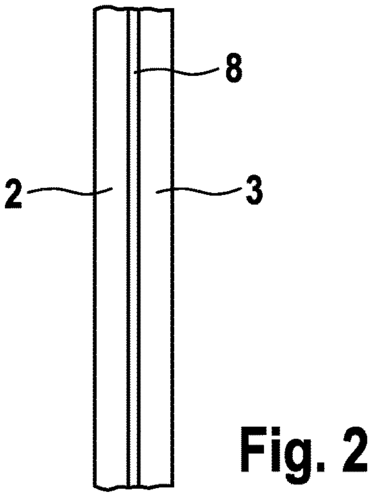
FIG. 2 is a section through the bag from FIG. 1 in the region of the separable seam when the seam is closed.
Figure 3:
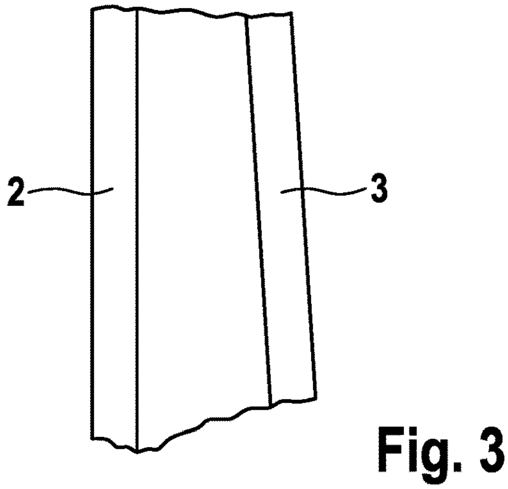
FIG. 3 is a section through the bag from FIG. 1 in the region of the separable seam when the seam is open.

FIG. 2 is a section through the multi-chamber bag 1 from FIG. 1 in the region of the separable seam 8. FIG. 2 shows the two films 2, 3, which are interconnected in a fluid-tight manner by means of the separable seam 8 in order to divide the bag volume into the first and the second chamber. The geometry of the bag is determined by the dimensions of the films and the quantity of the liquids contained in the two chambers. When the separable seam 8 is intact, the two films 2, 3 lie flat against one another in a particular spatial orientation in the region of the separable seam. When the separable seam has been torn open, however, the two films 2, 3 do not lie flat against one another in the region of the separable seam. FIG. 3 shows that the films 2, 3 are arranged at a distance from one another and are offset from one another or are misaligned relative to one another when the seam 8 is open.

The multi-chamber bag 1 according to the invention is characterised by a structure 10, which is visually perceptible to the user, for signalling the state of the separable seam 8, and is provided in the region of the separable seam 8. The structure 10 for signalling the state of the separable seam, which is shown in FIG. 1 by a shaded area, shows the user whether the separable seam is open or closed. The structure, which is perceptible to the viewer, can have various designs.

In the following, various embodiments of the structure for signalling the state of the separable seam are described in detail with reference to FIGS. 4 to 11.

FIG. 4A to 4D show different embodiments of the structure 10 for signalling the state of the separable seam, which is composed of individual structural elements 11 that are provided in a predetermined spatial arrangement relative to one another in the region of the separable seam 8 on the films 2, 3 that are arranged against one another. The structural elements 11 are image elements and/or symbol elements that are applied to the two films. The image elements and/or symbol elements 11 are preferably printed onto the films 2, 3. Known printing methods may be used for this purpose.

The structure 10 for signalling the state of the separable seam is only visible to the viewer when the two films 2, 3 of the bag 1 lie flat against one another in the predetermined orientation, i.e. the separable seam 8 is closed (FIG. 2). Otherwise, the viewer cannot identify the graphical structure 10, or at least can only identify it with difficulty (FIG. 3). The graphical structure 10 may be provided on the two films along the separable seam either over the entire length of the seam or only over part of the length of the seam. A plurality of different structures may also be provided along the seam.

Figures 4A, 4B, 4C, 4D:
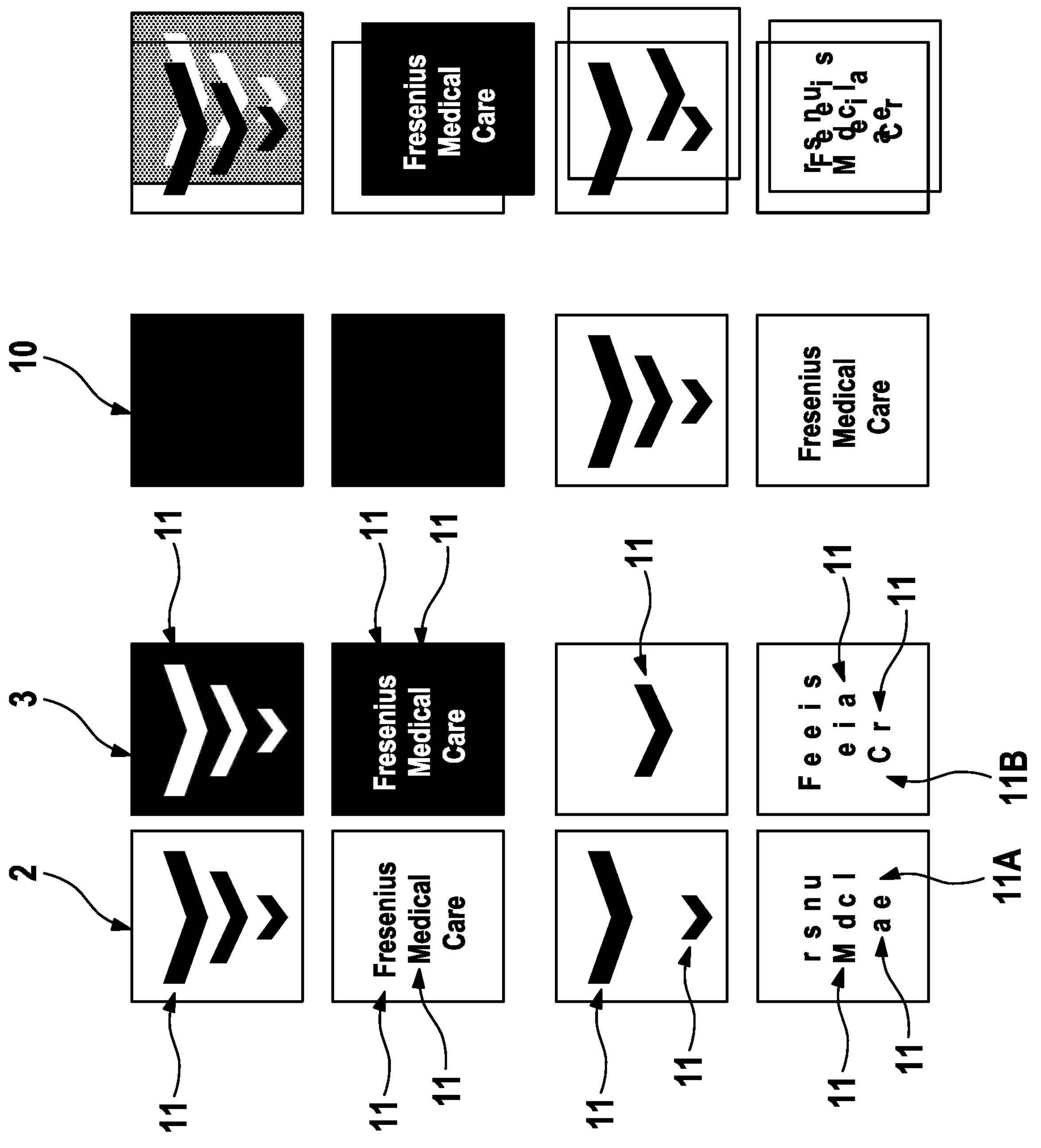
FIG. 4A-4D show different embodiments of graphical structures for signalling the state of the seam.

FIG. 4A shows an embodiment of a graphical structure 10 which is designed as a preferably black area having a particular spatial extent, for example a rectangular or square area. This structure may repeat at predetermined intervals in the region of the separable seam. It may be exactly the width of the separable seam, or may also extend beyond said seam. It may, however, also be narrower than the separable seam.

The image elements and/or symbol elements 11 are lines or areas in this case. Lines which form a positive image of a logo of the applicant are applied to, preferably printed onto, the upper film 2 in the region of the separable seam 8. An area which corresponds to the region of the upper film 2 to which the lines are not applied is applied to, preferably printed onto, the lower film 3 in the region of the separable seam, i.e. the negative image of the logo is applied to the lower film. When the separable seam is closed, such that the films 2, 3 lie flat against one another in the predetermined spatial orientation (FIG. 2), only a black area 10 is apparent to the viewer. If the seam is open, however, the films 2, 3 are arranged at a distance from one another and/or offset from one another and/or misaligned relative to one another and are not in a precise spatial orientation relative to one another, and therefore the black area is no longer visible. The viewer can then identify the logo as a positive image or a negative image, depending on the side from which the viewer is looking at the bag. The black area may for example be ascribed the meaning whereby the separable seam is intact and therefore the two liquids are not yet mixed together, and the logo may be ascribed the meaning whereby the separable seam is open and therefore the two liquids have been mixed together to form the ready-to-use solution. Instead of black lines, coloured lines, for example red lines, may be applied to the transparent upper film 2, while the lower film 3 may be a transparent film to which a corresponding coloured area, for example a red area, can be applied.

If a continuous series of these structures is provided on the separable seam, the separable seam is apparent to the viewer as a black line. When the seam is open, a series of logos is apparent to the viewer. If the seam is only partially torn open, the logos are only apparent in the portion of the seam that is torn open, while the intact portion of the seam is apparent as a black line.

FIG. 4B shows another embodiment of a graphical structure 10 which is designed as a black area having a particular spatial extent, preferably a rectangular or square area. In this case, the image elements and/or symbol elements 11 of the graphical structure 10 are characters of a series of words that constitute the company name of the applicant. The individual characters are applied to, preferably printed onto, the upper film 2 in the region of the separable seam 8 in the form of black letters, for example. A for example black area, which corresponds to the region of the upper film to which the lines are not applied, is applied to, preferably printed onto, the lower film 3 in the region of the separable seam. When the separable seam is closed and the films 2, 3 lie flat against one another in the predetermined spatial orientation, only a black background is apparent to the viewer, i.e. the characters are not legible. If the separable seam is open, however, the upper or lower wording is apparent to the viewer. The black area may for example be ascribed the meaning whereby the seam 8 is intact, and the wording may be ascribed the meaning whereby the seam has been torn open.

Instead of a logo or instead of characters, the bag may however also be provided with a machine-readable code, such that the machine-readable code can be identified when the films do not lie against one another in the region of the separable seam, and cannot be identified when the films lie against one another in the region of the separable seam, i.e. only a black or grey area is visible.

FIG. 4C shows another embodiment of a graphical structure 10 which is composed of linear image elements and/or symbol elements 10 and constitutes a logo of the applicant. The upper and lower linear element 11 of the logo are applied to the upper film 2 in the region of the separable seam 8 and the central linear element 11 of the logo is applied to the lower film 3 in the region of the separable seam. When the seam is closed and the films 2, 3 lie flat against one another in the predetermined spatial orientation, the logo together with all the linear elements is apparent to the viewer, while the logo is not visible to the viewer when the seam is open, and therefore the spatial arrangement of the image elements and/or symbol elements 11 no longer exists. The logo may for example be ascribed the meaning whereby the seam is closed.

FIG. 4D shows another embodiment in which symbol elements 11 that form parts 11A, 11B of a series of words, for example the company name of the applicant, in the predetermined spatial arrangement are applied to the upper and the lower film 2, 3. A first part 11A of the company name is applied to the upper film 2 in the region of the separable seam 8 and a second part 11B of the company name is applied to the lower film 3 in the region of the separable seam 8. The first part 11A and the second part 11B complement one another to form the company name when the two films 2, 3 lie flat against one another and the separable seam 8 is closed. Otherwise, the viewer cannot identify the company name. The user can therefore assume that the separable seam 8 is still intact provided that the company name can be identified.

In the region of the separable seam 8, the image elements and/or symbol elements 11 may also form a first pattern on the upper film 2 and a second pattern on the lower film 3, which join together to form a third pattern when the films lie flat against one another. FIG. 5 shows different patterns as examples, with the first pattern being denoted by the reference sign I and the second pattern being denoted by the reference sign II.

FIG. 6A to 6C show an embodiment in which the image elements and/or symbol elements 11 of the graphical structure 10 are stripes that are applied to the upper and the lower film 2, 3 along the separable seam 8 and form a striped pattern. The stripes may be dark, preferably black, stripes, or may be stripes of any colour. The stripes are offset from one another on the two films 2, 3 along the separable seam such that the stripes are visible as a dark, preferably black or coloured, area when the films lie against one another, i.e. when the seam is closed (FIG. 6C). Otherwise, only the striped patterns are visible (FIGS. 6A and 6B).

FIG. 7A to 7C show an embodiment in which the structural elements 11 of the graphical structure 10 are transparent, coloured portions of the upper and the lower film 2, 3 in the region of the separable seam. The upper film 2 is for example a red transparent film portion in the region of the separable seam, while the lower film 3 is a green transparent film portion in the region of the separable seam, which is represented by the different shaded areas. The graphical structure 10 is apparent to the viewer as a yellow area (mixed colour made up of red and green) when the red and the green transparent film portion 2, 3 lie against one another and the separable seam 8 is closed.

FIG. 8A to 8E show a graphical structure 10 in which the image elements and/or symbol elements 11 along the separable seam are stripes (FIG. 8A) that are applied to the upper film 2 and stripes (FIG. 8B) that are applied to the lower film 3, which form a striped pattern. The stripes are black stripes which are offset from one another on the two films 2, 3 along the separable seam 8 such that said stripes are visible as a dark, preferably black, area 10 when the films lie against one another, i.e. when the seam is closed (FIG. 8C). FIGS. 8D and 8E show that a black area is not visible when the separable seam 8 is open and the films are at a distance from one another or are offset or misaligned relative to one another.

FIG. 9A to 9E show a graphical structure 10 in the form of a matrix code. The image elements and/or symbol elements 11 are square black areas that are applied, in the region of the separable seam 8, to the upper film 2 (FIG. 9A) and to the lower film 3 (FIG. 9B) such that the square black areas complement one another to form the matrix code when the separable seam is closed and the films 2, 3 lie against one another (FIG. 9C) and do not form the matrix code when the separable seam is open, meaning that the correct spatial arrangement of the square areas no longer exists (FIGS. 9D and 9E).

Figure 10A:
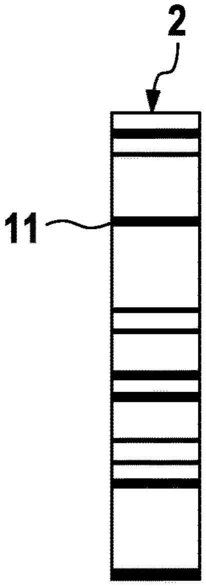
FIG. 10A-10D show an embodiment of a graphical structure designed as a machine-readable bar code for signalling the state of the seam.
Figure 10B:
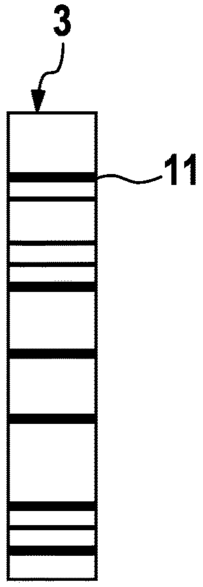
Figure 10C:
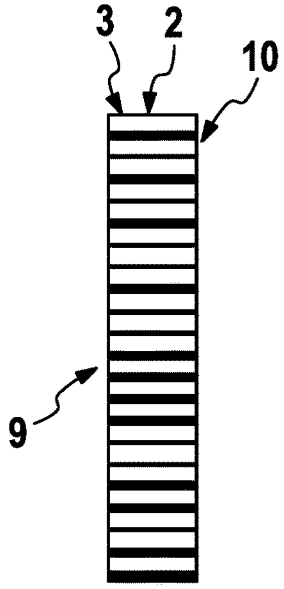
Figure 10D:
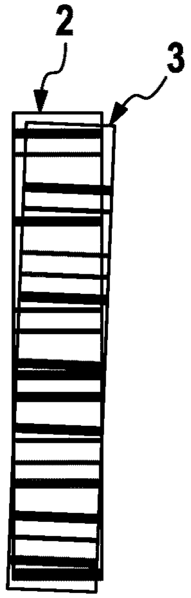

FIG. 10A to 10D show another embodiment, in which the graphical structure 10 is a bar code. The image elements and/or symbol elements 11 are black stripes that are applied, in the region of the separable seam 8, to the upper film 2 (FIG. 10A) and to the lower film 3 (FIG. 10B) such that the stripes complement one another to form the bar code when the separable seam is closed and the films 2, 3 lie against one another (FIG. 100) and do not form the bar code when the separable seam is open, meaning that the correct spatial arrangement of the stripes no longer exists (FIG. 10D).

Figure 11A:
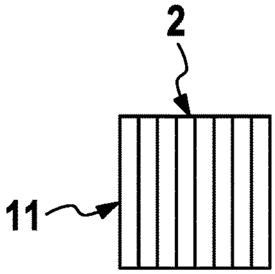
FIGS. 11A-11D show another embodiment of a structure for signaling the state of the seam.
Figure 11B:
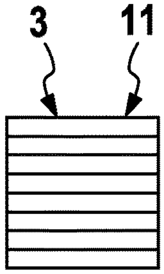
Figure 11C:
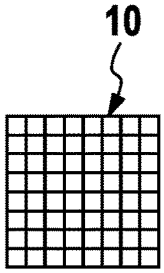
Figure 11D:
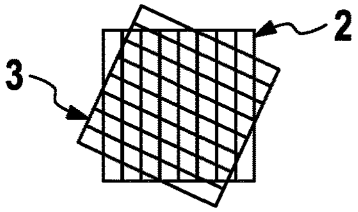

FIG. 11A to 11D show an alternative embodiment in which the structure 10 for identifying the state of the separable seam 8 comprises portions of the upper and the lower film 2, 3 in the region of the separable seam 8 which have particular polarising properties. FIG. 11A shows the upper film 2 and FIG. 11B shows the lower film 3, the films being arranged at an angle of polarisation of 90° relative to one another when the separable seam is closed (FIG. 11C). The film portions function as polarisers that filter out visible light having a certain polarisation. The polarising films are arranged such that light cannot pass through the films, or can only pass through said films to a limited extent, when the films lie against one another in the predetermined orientation (FIG. 11C), i.e. the separable seam is closed, and light can pass through the films when they do not lie against one another in the predetermined orientation (FIG. 11D), i.e. the separable seam is open. The closed seam is then apparent to the viewer as a black or dark area, while the open seam is apparent as a light or grey area.

Figure 12:
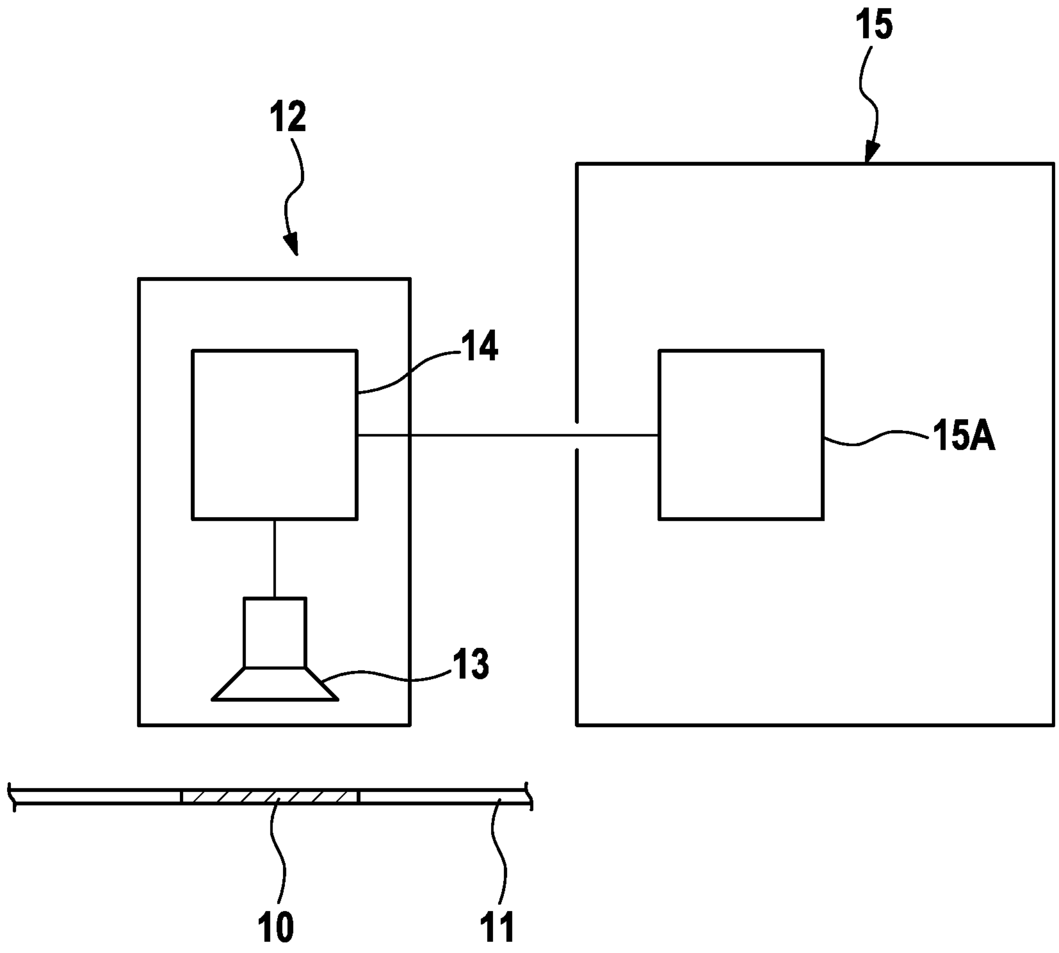
FIG. 12 is a highly simplified schematic view of a monitoring device for monitoring the state of the seam.

The bag 1 according to the invention makes it possible to monitor the fill level in an automated manner using a monitoring device. FIG. 12 is a highly simplified schematic view of a monitoring device 12 which comprises an optical read apparatus 13 and an evaluation unit 14. The evaluation unit 14 is configured such that a signal signalling the state of the separable seam is generated when the graphical structure 10 is detected on the bag 1. Known methods may be used for image recognition. The signal from the evaluation unit 14 may be received by a control unit 15A of a medical device 15 (merely indicated here), for example by a dialysis device, which is controlled by the control unit 15A on the basis of the signal.

The invention claimed is:

1. A multi-chamber bag for medical purposes, which is formed by an upper film and a lower film that are arranged against one another, each of the upper film and the lower film being made of an at least partially transparent material, the upper film and the lower film being interconnected in a liquid-tight manner by at least one non-separable seam, wherein a volume is defined by the bag, the volume is divided into at least two chambers by at least one separable seam, the multi-chamber bag is provided with a first visually perceptible structure applied to the upper film and a second visually perceptible structure applied to the lower film, in a closed state of the at least one separable seam, the upper film and the lower film are arranged against one another, in a predetermined spatial arrangement relative to one another, in the region of the at least one separable seam, the first visually perceptible structure and the second visually perceptible structure combine with one another to form a third structure that is visually perceptible when a viewer looks at the upper film from above or looks at the lower film from below, the third structure differing from each of the first visually perceptible structure and the second visually perceptible structure, and in an open state of the at least one separable seam, the upper film and the lower film do not lie against one another in the predetermined spatial arrangement in the region of the at least one separable seam, and the first visually perceptible structure and the second visually perceptible structure do not combine with one another to form the third structure.

2. The multi-chamber bag according to claim 1, wherein, in the closed state of the at least one separable seam, the first visually perceptible structure and the second visually perceptible structure are arranged in the predetermined spatial arrangement relative to one another such that regions of the upper film, which comprise the first visually perceptible structure, lie over regions of the lower film, which do not comprise the second visually perceptible structure, and regions of the lower film, which comprise the second visually perceptible structure, lie below regions of the upper film, which do not comprise the first visually perceptible structure, such that the first visually perceptible structure and the second visually perceptible structure complement one another to form the third structure.

3. The multi-chamber bag according to claim 1, wherein the first visually perceptible structure and the second visually perceptible structure are transparent regions of the upper film and the lower film, respectively, the first structure and the second structure are of different colors, the upper film has, in the region of the at least one separable seam, at least one transparent region that is of a first color and lies over a transparent region of the lower film, the transparent region of the lower film is of a second color that differs from the first color, and, in the closed state of the at least one separable seam, the third structure comprises a third color that is different than the first color and different than the second color.

4. The multi-chamber bag according to claim 1, wherein the first visually perceptible structure and the second visually perceptible structure are designed as patterns, the first visually perceptible structure forms a first pattern on the upper film in the region of the at least one separable seam, the second visually perceptible structure forms a second pattern on the lower film in the region of the at least one separable seam, the first pattern differs from the second pattern, the third structure comprises a third pattern, and the third pattern differs from the first pattern and differs from the second pattern.

5. The multi-chamber bag according to claim 1, wherein the third structure is a word, a series of words, or a symbol.

6. The multi-chamber bag according to claim 5, wherein a first part of the word, the series of words, or the symbol, is provided on the upper film in the region of the at least one separable seam, and a second part of the word, the series of words, or the symbol is provided on the lower film, and, in the closed state of the at least one separable seam, the first part and the second part complement one another to form the word, the series of words, or the symbol.

7. The multi-chamber bag according to claim 1, wherein the first visually perceptible structure and the second visually perceptible structure are image elements and/or symbol elements printed onto the upper film and the lower film, respectively.

8. The multi-chamber bag according to claim 7, wherein the image elements and/or symbol elements are circular, arc-shaped, elliptical, square, or rectangular elements.

9. The multi-chamber bag according to claim 1, wherein the at least two chambers of the multi-chamber bag are filled with components of a medical solution for infusion or dialysis.

10. The multi-chamber bag according to claim 1, wherein the at least one non-separable seam is a peripheral seam, or the at least one non-separable seam is more than one non-separable seam and the multi-chamber bag is made of a film sleeve that is closed by the more than one non-separable seam at an upper edge and at a lower edge of the multi-chamber bag.

11. A multi-chamber bag for medical purposes, which is formed by films that are arranged against one another, the films being made of an at least partially transparent material and being interconnected in a liquid-tight manner using at least one non-separable seam, wherein a volume defined by the bag is divided into at least two chambers by at least one separable seam, by means of which the films arranged against one another are interconnected in a liquid-tight manner, the multi-chamber bag is provided with at least one visually perceptible structure that signals the state of the at least one separable seam and that is composed of structural elements of the films arranged against one another in the region of the at least one separable seam, the structural elements are in a predetermined spatial arrangement relative to one another such that the structural elements in the region of the at least one separable seam complement one another to form the at least one visually perceptible structure signaling the state of the at least one separable seam when the at least one separable seam is closed, the films in the region of the at least one separable seam do not lie against one another in a predetermined orientation, and do not complement one another to form the at least one visually perceptible structure signaling the state of the at least one separable seam, when the at least one separable seam is open, the films in the region of the at least one separable seam do not lie against one another in the predetermined orientation, when the predetermined spatial arrangement of the structural elements relative to one another in the region of the at least one separable seam no longer exists, and the at least one visually perceptible structure signaling the state of the at least one separable seam is a machine-readable code composed of a plurality of elements.

12. The multi-chamber bag according to claim 11, wherein the plurality of elements of the machine-readable code in the region of the at least one separable seam are arranged in the predetermined spatial arrangement relative to one another on the films that are arranged against one another, the structural elements complement one another to form the machine-readable code when the at least one separable seam is closed, the films in the region of the at least one separable seam do not lie against one another and do not complement one another to form the machine-readable code, when the at least one separable seam is open, and the films in the region of the at least one separable seam do not lie against one another, when the predetermined spatial arrangement of the structural elements forming the machine-readable code relative to one another no longer exists.

13. A multi-chamber bag for medical purposes, which is formed by films that are arranged against one another, the films being made of an at least partially transparent material and being interconnected in a liquid-tight manner using at least one non-separable seam, wherein a volume is defined by the bag, the volume is divided into at least two chambers by at least one separable seam in the region of the at least one separable seam, the multi-chamber bag is provided with at least one visually perceptible structure that signals the state of the at least one separable seam and that is formed by regions of the films that lie against one another, the regions of the films that lie against one another are designed as polarizers, the structure signaling the state of the at least one separable seam is apparent to the viewer, when the at least one separable seam is closed, the films in the region of the at least one separable seam lie against one another in a predetermined orientation such that the structure signaling the state of the at least one separable seam is not apparent to the viewer when the at least one separable seam is open, and the films in the region of the at least one separable seam do not lie against one another in the predetermined orientation, when the predetermined spatial arrangement of the polarizers relative to one another no longer exists.

14. A method for identifying a state of a separable seam of a multi-chamber bag for medical purposes, which is formed by films that are arranged against one another and that are made of an at least partially transparent material, the films being interconnected in a liquid-tight manner by at least one non-separable seam, wherein a volume is defined by the bag, the volume is divided into at least two chambers by the at least one separable seam, the multi-chamber bag is provided with at least one visually perceptible structure that signals the state of the at least one separable seam and that is composed of structural elements that the films arranged against one another comprise in the region of the at least one separable seam, in a closed state of the at least one separable seam, the structural elements are in a predetermined spatial arrangement relative to one another such that the structural elements in the region of the at least one separable seam complement one another to form the at least one visually perceptible structure signaling that the at least one separable seam is closed, and in an open state of the at least one separable seam, the films in the region of the at least one separable seam do not lie against one another in the predetermined spatial arrangement and do not complement one another to form the at least one visually perceptible structure, wherein the method comprises monitoring the multi-chamber bag using a monitoring device that comprises (i) an optical read apparatus for detecting the visually perceptible structure and (ii) an evaluation unit, the evaluation unit being configured such that a signal, signaling the closed state of the at least one separable seam, is generated when the visually perceptible structure is detected on the multi-chamber bag.

15. The method according to claim 14, wherein the visually perceptible structure is a machine-readable code composed of a plurality of the structural elements that are applied to the films that are arranged against one another, in the predetermined spatial arrangement of the structural elements in the region of the at least one separable seam, the structural elements complement one another to form the machine-readable code and the at least one separable seam is closed, the films in the region of the at least one separable seam do not lie against one another, and the structural elements do not complement one another to form the machine-readable code, when the at least one separable seam is open, and the films in the region of the at least one separable seam do not lie against one another when the predetermined spatial arrangement of the structural elements forming the machine-readable code no longer exists.

16. The method according to claim 14, wherein the visually perceptible structure is a machine-readable code composed of the structural elements and the machine-readable code can be identified when the films do not lie against one another in the region of the at least one separable seam and the structural elements are not in the predetermined spatial arrangement, and the machine-readable code cannot be identified when the films lie against one another in the region of the at least one separable seam and the structural elements are in the predetermined spatial arrangement.

17. A method for identifying the state of a separable seam of a multi-chamber bag for medical purposes, which is formed by films that are arranged against one another and that is made of an at least partially transparent material, the films being welded to one another in a liquid-tight manner using at least one non-separable seam, wherein a volume is defined by the bag, the volume is divided into at least two chambers by at least one separable seam, in the region of the at least one separable seam, the multi-chamber bag is provided with at least one visually perceptible structure that signals the state of the at least one separable seam and that is formed by regions of films that lie against one another, the regions of films that lie against one another are designed as polarizers, in a closed state of the at least one separable seam the at least one visually perceptible structure signaling the state of the at least one separable seam is apparent to a viewer and the films in the region of the at least one separable seam lie against one another in a predetermined orientation, and in an open state of the at least one separable seam the at least one visually perceptible structure is not apparent to the viewer and the films in the region of the at least one separable seam do not lie against one another in the predetermined orientation, and wherein the method comprises monitoring the multi-chamber bag using a monitoring device that comprises (i) an optical read apparatus for detecting the at least one visually perceptible structure signaling the state of the at least one separable seam, and (ii) an evaluation unit, the evaluation unit being configured such that a signal, signaling the closed state of the at least one separable seam, is generated when the at least one visually perceptible structure is detected on the multi-chamber bag.

18. A system comprising a blood treatment device and the multi-chamber bag according to claim 1.

19. The system according to claim 18, further comprising a monitoring device that comprises (i) an optical read apparatus for detecting the third structure, and (ii) an evaluation unit, the evaluation unit being configured such that a signal, signaling the closed state of the at least one separable seam, is generated when the third structure is detected on the multi-chamber bag.

* * * * *